US009411465B2

(12) United States Patent
Govindarajeswaran (10) Patent No.: US 9,411,465 B2
(45) Date of Patent: Aug. 9, 2016

(54) SYSTEMS AND METHODS FOR GENERATING A SECURE LOCKING INTERFACE

(71) Applicant: Wipro Limited, Bangalore (IN)

(72) Inventor: Maheshwaran Govindarajeswaran, Chennai (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 14/338,804

(22) Filed: Jul. 23, 2014

(65) Prior Publication Data

US 2015/0355776 A1    Dec. 10, 2015

(30) Foreign Application Priority Data

Jun. 6, 2014   (IN) ............................ 2786/CHE/2014

(51) Int. Cl.
*G06F 3/041*      (2006.01)
*G06F 21/82*      (2013.01)
*G06F 21/36*      (2013.01)

(52) U.S. Cl.
CPC .............. *G06F 3/0416* (2013.01); *G06F 21/36* (2013.01); *G06F 21/82* (2013.01)

(58) Field of Classification Search
CPC ..... G06F 23/6218; G06F 3/0481; G07F 7/10; G07F 7/1041; G07C 9/00142; G06Q 20/206
See application file for complete search history.

(56) References Cited

U.S. PATENT DOCUMENTS

| 6,543,684 | B1 | 4/2003 | White et al. |
| 6,549,194 | B1 | 4/2003 | McIntyre et al. |
| 8,392,846 | B2 * | 3/2013 | Carapelli ............. G06Q 20/206 345/173 |
| 2006/0020815 | A1 * | 1/2006 | Varghese ................ G06F 21/36 713/182 |
| 2011/0288965 | A1 | 11/2011 | Lazarro et al. |

FOREIGN PATENT DOCUMENTS

GB    2504157 A    1/2014

* cited by examiner

*Primary Examiner* — Christopher E Leiby
(74) *Attorney, Agent, or Firm* — LeClairRyan, a Professional Corporation (57) ABSTRACT

Systems and methods for generating a secure locking interface on a touch-screen display of a computing device are disclosed. The system comprises a processor, a memory communicatively coupled to the processor, wherein the memory stores processor-executable instructions, which, on execution, cause the processor to perform operations comprising associating a first attribute and a second attribute to at least one alphanumeric code upon receiving an authentication request for authenticating a user. The first attribute and the second attribute include at least one of colors, shapes, special characters, and images. Further, the operations comprise rendering an alphanumeric interface to the touch-screen display. The alphanumeric interface has the at least one alphanumeric code with the first attribute and the second attribute associated. Further, the operations comprise rendering a keypad interface to the touch-screen display, wherein the keypad interface has an input key for each of the first attribute and the second attribute.

12 Claims, 6 Drawing Sheets

Figure 5

SYSTEMS AND METHODS FOR GENERATING A SECURE LOCKING INTERFACE

This application claims the benefit of Indian Patent Application Serial No. 2786/CHE/2014, filed Jun. 6, 2014, which is hereby incorporated by reference in its entirety.

TECHNICAL FIELD

The present subject matter is related, in general to a secure interface and, in particular, but not exclusively to methods and systems for generating a secure locking interface.

BACKGROUND

Nowadays, a number of financial transactions are carried out in public places through electronic cards, such as debit cards and credit cards. Typically, to complete a financial transaction, a customer is asked to enter a Personal Identification Number (PIN) or a password for authentication. In such cases, entering of the PIN is exposed to prying eyes, resulting in easy hack of the PIN by watching pattern of finger flow while entering the PIN for transaction. Therefore, there are concerns on securing the PIN entries from shoulder surfing while performing the financial transaction using the electronic cards. Further, these concerns are also applicable to any authentication lock pad for entering the PIN for authentication, for example, device locks, lockers, door locks, Point-of-Sale (PoS), automated Teller Machine (ATM), etc where the user is supposed to enter the PIN in public places.

SUMMARY

Disclosed herein are systems and methods for generating a secure locking interface on a touch-screen display of a computing device. In one example, the system, for generating the secure locking interface, comprises a processor, a memory communicatively coupled to the processor, wherein the memory stores processor-executable instructions, which, on execution, cause the processor to associate a first attribute and a second attribute to at least one alphanumeric code upon receiving an authentication request for authenticating a user. The first attribute and the second attribute include at least one of colors, shapes, special characters, and images. The processor-executable instructions, on execution, further cause the processor to render an alphanumeric interface to the touch-screen display. The alphanumeric interface has the at least one alphanumeric code with the first attribute and the second attribute associated. The processor-executable instructions, on execution, further cause the processor to render a keypad interface to the touch-screen display, wherein the keypad interface has an input key for each of the first attribute and the second attribute.

In certain embodiments, the processor-executable instructions, on execution, further cause the processor to obtain a user input through the input key. The user input indicates a selection of the first attribute and the second attribute by the user. The processor-executable instructions, on execution, further cause the processor to determine an input alphanumeric code corresponding to a combination of the first attribute and the second attribute based on the user input. The processor-executable instructions, on execution, further cause the processor to authenticate the user based on the input alphanumeric code.

In certain embodiments, the at least one alphanumeric code has a unique combination of the first attributes and the second attribute In certain embodiments, one or more alphanumeric codes, from amongst the at least one alphanumeric code, have same combination of the first attribute and the second attribute. Moreover, sequence of the first attribute and the second attribute is different for each of the or more alphanumeric codes In certain embodiments of the disclosure relates to a method for generating a secure locking interface on a touch-screen display of a computing device comprises associating a first attribute and a second attribute to at least one alphanumeric code upon receiving an authentication request for authenticating a user. The first attribute and the second attribute include at least one of colors, shapes, special characters, and images. The method further comprises rendering an alphanumeric interface, to the touch-screen display, wherein the alphanumeric interface has the at least one alphanumeric code with the first attribute and the second attribute associated. The method further comprises rendering a keypad interface, to the touch-screen display. The keypad interface has an input key for each of the first attribute and the second attribute.

Certain embodiments of the present disclosure also relate to a non-transitory, computer-readable medium storing instructions that, when executed by a processor, cause the processor to perform operations comprising generating a secure locking interface on a touch-screen display of a computing device comprises associating a first attribute and a second attribute to at least one alphanumeric code upon receiving an authentication request for authenticating a user. The first attribute and the second attribute include at least one of colors, shapes, special characters, and images. In addition, the operations may comprise rendering an alphanumeric interface, to the touch-screen display, wherein the alphanumeric interface has the at least one alphanumeric code with the first attribute and the second attribute associated. Moreover, the operations may comprise rendering a keypad interface, to the touch-screen display. The keypad interface has an input key for each of the first attribute and the second attribute.

In certain embodiments of the present disclosure relates to a secure locking interface produced by an application program operating on a computing device. The secure locking interface comprises an alphanumeric interface comprising at least one alphanumeric code associated with a first attribute and a second attribute. The secure locking interface further comprises a keypad interface comprising an input key for each of the first attribute and the second attribute.

In certain embodiments, the first attribute and the second attribute include at least one of colors, shapes, special characters, and images.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments. Further, examples and features of disclosed principles described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Presently, various techniques are used to address the concerns related to secure PIN entry in public places. In one conventional technique, layout of keypad is dynamically changed to ensure secure PIN entry. In one example, positions of numbers are changed. In another example, spacing between buttons on the keypad is varied. In another example, dimensions of the buttons are changed. These changes in the layout of keypad may cause delay in the PIN entry by the user as every time a different keypad is provided to the user. Specially, in case of elderly users, the delay may be significant. Further, change in the layout may also increase the number of unwanted errors in the PIN entries by the user as the keypad is unfamiliar to the user due to frequent change in the layout. Thereby, leading to more chances of cancellation of the transaction and unnecessary disabling of the electronic card due to repeated erroneous entry. Also, the delay in the PIN entry may create additional opportunity for the hackers to see through or record the PIN entry.

The present subject matter discloses systems and methods for generating a secure locking interface on a touch-screen display of a computing device. The present subject matter associates one or more attributes, such as colors, shapes, special characters, and images to each key on keypad and generates the secure locking interface through which a user can select the one or more attributes which corresponds to the PIN. Therefore, with the present subject matter, a user can easily get authenticated by entering PIN without disclosing the PIN to prying eyes of shoulder surfers or onlookers.

Systems and methods for generating the secure locking interface may be implemented in a variety of computing systems. The computing systems that can implement the described method(s) include, but are not limited to a server, a desktop personal computer, a notebook or a portable computer, a mainframe computer, a laptop, a tablet, and a mobile phone. Although the description herein is with reference to certain computing systems, the systems and methods may be implemented in other computing systems, albeit with a few variations, as will be understood by a person skilled in the art.

Further, working of the systems and methods for generating the secure locking interface is described in conjunction with FIGS. 1-5. It should be noted that the description and drawings merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and are to be construed as being without limitation to such specifically recited examples and conditions. Moreover, all statements herein reciting principles, aspects, and embodiments of the present subject matter, as well as specific examples thereof, are intended to encompass equivalents thereof. While aspects of the systems and methods can be implemented in any number of different computing systems environments, and/or configurations, the embodiments are described in the context of the following exemplary system architecture(s).

Figure 1:
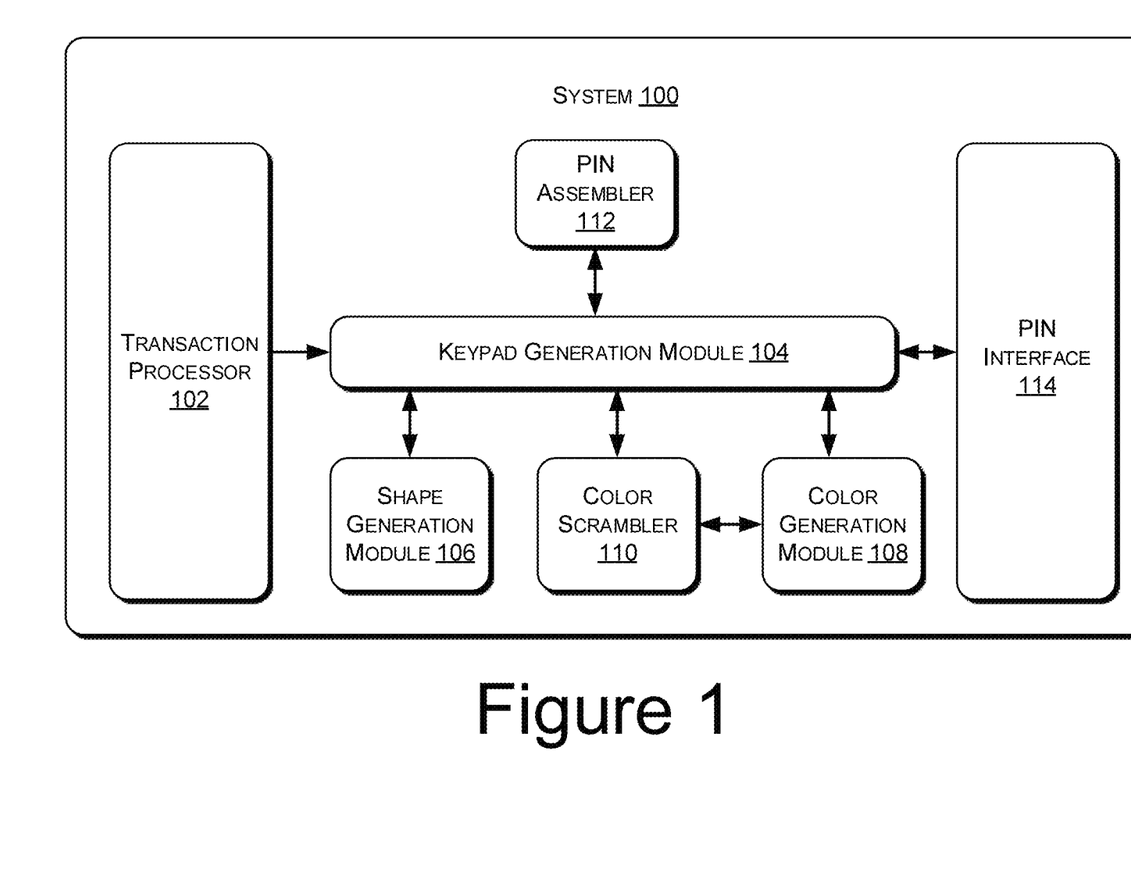
FIG. 1 illustrates a block diagram of an exemplary system for generating a secure locking interface, according to some embodiments of the present disclosure.

FIG. 1 illustrates a block diagram of an exemplary system 100 for generating a secure locking interface, according to some embodiments of the present disclosure. As shown in FIG. 1, the system 100 comprises a transaction processor 102, a keypad generation module 104, a shape generation module 106, a color generation module 108, a color scrambler 110, a PIN assembler 112, and a PIN interface 114.

In operations, when an Electronic Fund Transfer at Point of Sale (EFTPOS) is initiated, by an electronic card, to make payment, the transaction processor 102 may obtain card information from the electronic card. The card information may include details, such as card number, expiry date, and name of card holder. The transaction processor 102 may also obtain transaction information, such as transaction amount, and merchant information from a POS device.

Upon receiving the card information and the transaction information, the transaction processor 102 may instruct the keypad generation module 104 to generate a secure locking interface for authentication a user. Thereafter, the keypad generation module 104 coordinates with the shape generation module 106, the color generation module 108, and the color scrambler 110 to obtain attributes to be associated with each key of a keypad. Each key in the keypad may represent an alphanumeric code. In an example, the attributes may include at least one of colors and shapes. It may be noted that, the system 100 may comprise other modules also, other than the shape generation module 106 and the color generation module 108, to generate attributes such as images and special characters that can be associated with the alphanumeric codes present on the keypad.

Subsequently, the shape generation module 106 may generate one or more shapes, such as a triangle, a circle, a square, a diamond, and a hexagon that can be associated with the alphanumeric codes as one of the attributes. Similarly, the color generation module 108 may generate one or more colors that can be associated with the alphanumeric codes. In one example, the color generation module 108 may generate three color codes (0-255) using the card information and transaction information. Then, the color codes may be converted into hexadecimal codes and sent to the keypad generation module 104. For example, for Red color, the color generation module 108 may send hexadecimal code 'FF0000' to the keypad generation module 104.

In one implementation, a unique combination of shape and color may be associated with each of the alphanumeric codes as a first attribute and a second attribute. In another implementation, combination of two different colors may also be associated with each of the alphanumeric codes as a first attribute and a second attribute. In case of two different colors, the color scrambler 110 ensures that sequence of combination of two different colors is not repeated for a particular alphanumeric code. In an example, the color scrambler 110 also makes sure that two colors associated with an alphanumeric code should have different shades so that a user doesn't find it difficult to distinguish between the colors.

Thereafter, the keypad generation module 104 obtains the attributes generated by the shape generation module 106 and the color generation module 108. The keypad generation module 104 associates the attributes received to the alphanumeric codes. The keypad generation module 104 may then instructs the PIN interface 114 to render an alphanumeric interface, to a touch-screen display to the POS device, comprising the alphanumeric codes associated with the first attribute and the second attribute. The alphanumeric interface displays the alphanumeric codes along with the first attribute and the second attribute that are associated with the alphanumeric codes. Further, the PIN interface 114 renders a keypad interface to the touch-screen display. The keypad interface comprises an input key for each of the first attribute and the second attribute associated with the alphanumeric codes. For example, if numeric 1 is associated with Red color and Circle shape, then the keypad interface may have one input key for Red color and one input key for Circle shape. To enter the numeric 1, the user may press the input keys for the Red color and Circle shape. Since each of the alphanumeric code is associated with unique combination of the color and the shape, the user may follow any sequence for providing input, i.e., color and shape; or shape and color.

However, in case two different colors are associated with the alphanumeric codes, the user may have to follow a sequence to input the attributes as it is possible that two alphanumeric codes may have same combination of colors but in different sequence. For example, numeric 1 may be associated with Red and Blue color and numeric 2 may be associated with Blue and Red color. In such cases, the user needs to follow a sequence to input the corresponding alphanumeric code. Violation of such sequence may result in an error message.

Once, the secure locking interface, comprising the alphanumeric interface and the keypad interface, is rendered to the touch-screen display, the PIN interface 114 may instruct the user to input PIN for authentication. Then, the user may press the input keys in the keypad interface to input the PIN. The user needs to press the input keys for each of the alphanumeric codes present in the PIN. Thus, by pressing the input keys corresponding to the alphanumeric codes, the user provides the PIN. Since the user is not pressing the alphanumeric code present in the PIN, chances of prying on the PIN are eliminated.

Further, the PIN interface 114 receives user selection of the first attribute and the second attribute and send it to the PIN assembler 112 through the keypad generation module 104. Subsequently, the PIN assembler 112 interprets the user selection and determines alphanumeric codes corresponding to the first attribute and the second attribute received through the user selection. In this manner, the PIN assembler 112 determines the PIN and sends it to the transaction processor 102. In case, the PIN assembler 112 is not able to interpret the PIN due to invalid user selection, a failure message may be sent to the touch-screen display informing the user about failure.

The transaction processor 102, upon receiving the PIN, sends the PIN an authorization entity in secure fashion for authorization via a network by adhering to the Payment Card Industry Data Security standard (PCI DSS). In case of correct PIN entry, the user is authenticated and the financial transaction is completed. In case of incorrect PIN entry, the authentication is denied and financial transaction is cancelled. Further, a transaction failure message may be sent to the touch-screen display through the system 100. Furthermore, for subsequent PIN entries, a new secure locking interface may be generated.

Although description herein is for generating the secure locking interface for authentication of a user to complete a financial transaction, it may be noted that same concepts may be applied to device lock, door lock, ATM, etc., without deviating from scope of the present disclosure.

Figure 2A:
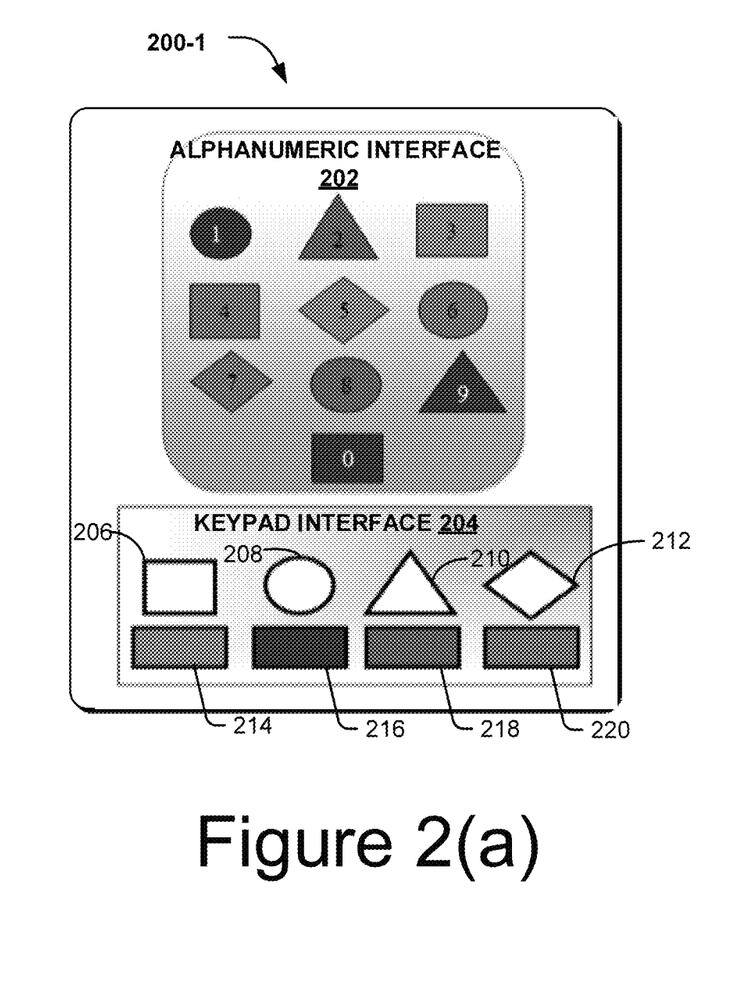
FIG. 2(a) shows an exemplary secure locking interface, according to an embodiment of the present disclosure.

FIG. 2(*a*) shows an exemplary secure locking interface 200-1, according to an embodiment of the present disclosure. As shown in FIG. 2(*a*), the secure locking interface 200-1 comprises an alphanumeric interface 202 and a keypad interface 204. In the secure locking interface 200-1, numeric codes are associated with a color and a shape. Association of the color and the shape with the numeric codes in FIG. 2(*a*) are as follows: Numeric 1 (Blue, Circle); Numeric 2 (Green, Triangle); Numeric 3 (Red, Square); Numeric 4 (Purple, Square); Numeric 5 (Red, Rhombus); Numeric 6 (Purple, Circle); Numeric 7 (Purple, Rhombus); Numeric 8 (Green, Circle); Numeric 9 (Blue, Triangle); and Numeric 0 (Blue, Square).

Further, as shown in FIG. 2(*a*), the keypad interface 204 comprises input keys for each of the attributes associated with the numeric codes. The keypad interface 204 has input keys: Square 206, Circle 208, Triangle 210, Rhombus 212, Red 214, Blue 216, Green 218, and Purple 220.

For inputting the PIN through the secure locking interface 200-1, the user may press the input keys corresponding to the attributes. In an example, say PIN is '4165'. To input the PIN through the secure locking interface 200-1, the user may first press color and then shape, i.e., (Purple, Square), (Blue, Circle), (Purple, Circle), and (Red, Rhombus) which corresponds to the PIN '4165'' In an example, the user may first press shape and then color, i.e., (Square, Purple), (Circle, Blue), (Circle, Purple), and (Rhombus, Red) since the sequence is not relevant for a case where shapes and colors are associated with the alphanumeric codes.

Figure 2B:
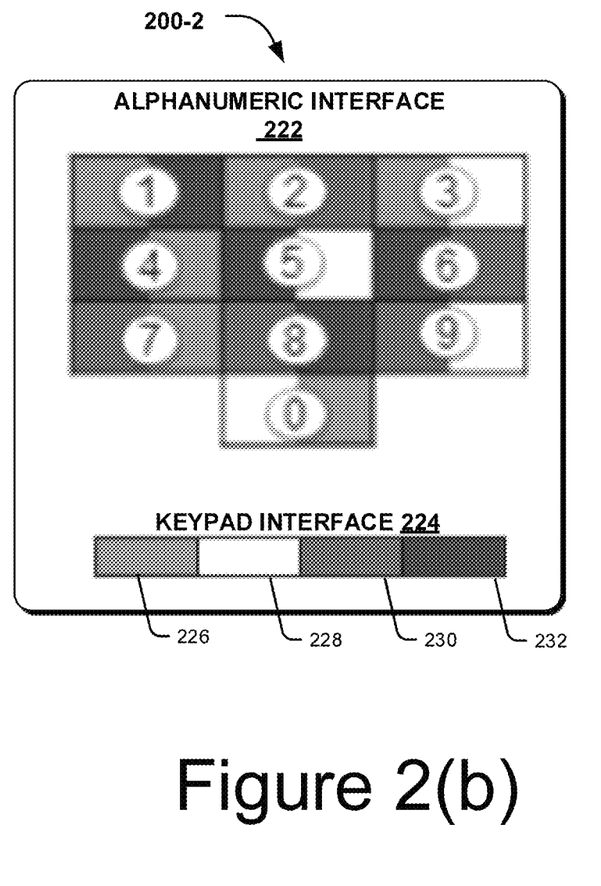
FIG. 2(b) shows an exemplary secure locking interface, according another embodiment of the present disclosure.

FIG. 2(*b*) shows an exemplary secure locking interface 200-2, according another embodiment of the present disclosure. As shown in FIG. 2(b), the secure locking interface 200-2 comprises an alphanumeric interface 222 and a keypad interface 224. The alphanumeric interface has numeric codes associated with two different colors and the keypad interface has the colors as input keys. Association of the colors with the numeric codes are as follows: Numeric 1 (Red, Blue); Numeric 2 (Red, Green); Numeric 3 (Red, White); Numeric 4 (Blue, Red); Numeric 5 (Blue, White); Numeric 6 (Blue, Green); Numeric 7 (Green, Red); Numeric 8 (Green, Blue); Numeric 9 (Green, White); and Numeric 0 (White, Red). Further, the keypad comprises input keys: Red 226, White 228, Green 230, and Blue 232.

For inputting the PIN through the secure locking interface 200-2, the user may press the input keys corresponding to the colors that are associated with the alphanumeric codes. In an example, say PIN is '7532'. To input the PIN through the secure locking interface 200-2, the user may press the input keys for the colors in a left-to-right sequence, i.e., (Green, Red), (Blue, White), (Red, White), and (Red, Green). Since, in case of two colors associated with the alphanumeric codes, a combination may be repeated for an alphanumeric code but sequence is different, a specific sequence must be followed. In said example, a left-to right sequence is followed. In case the sequence is not followed, the system 100 may fail to interpret or wrongly interpret the PIN as, both the numeric 2 and 7 have same combination of color but sequence of the color is different. Therefore, in implementation, where two colors are associated with the alphanumeric codes, a specific sequence is followed and the user may be made aware about the sequence through a notification.

Figure 3:
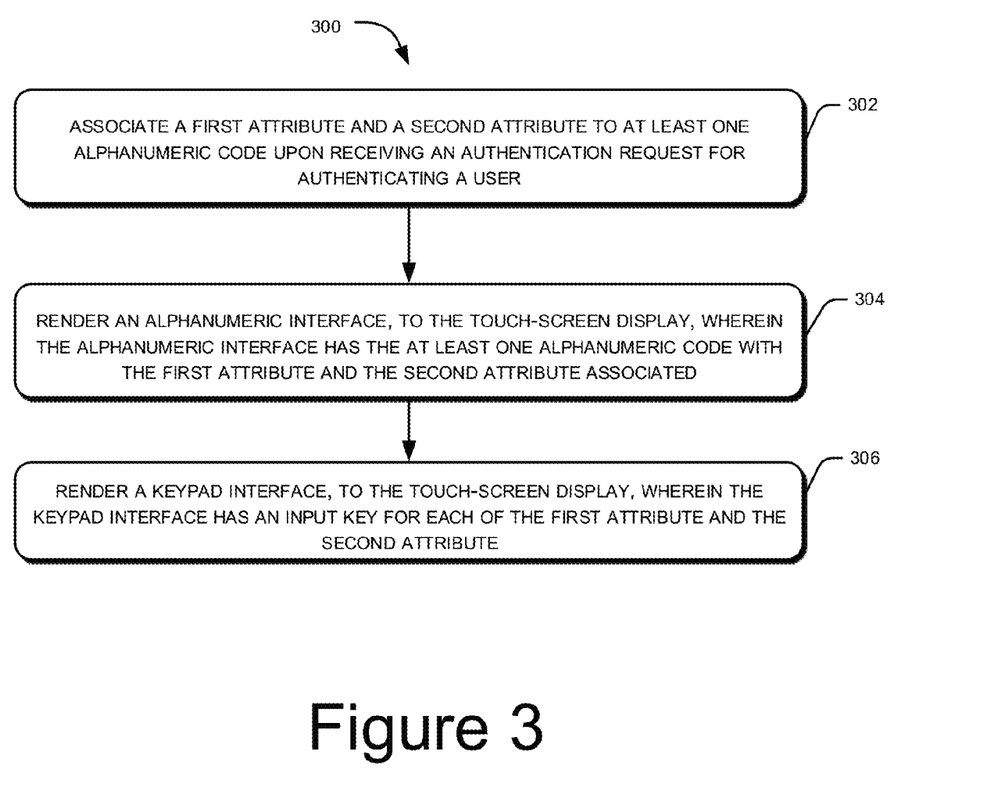
FIG. 3 illustrates an exemplary computer implemented method for generating a secure locking interface, according to some embodiments of the present disclosure.

FIG. 3 illustrates an exemplary computer implemented method for generating a secure locking interface, according to some embodiments of the present disclosure.

Figure 4:
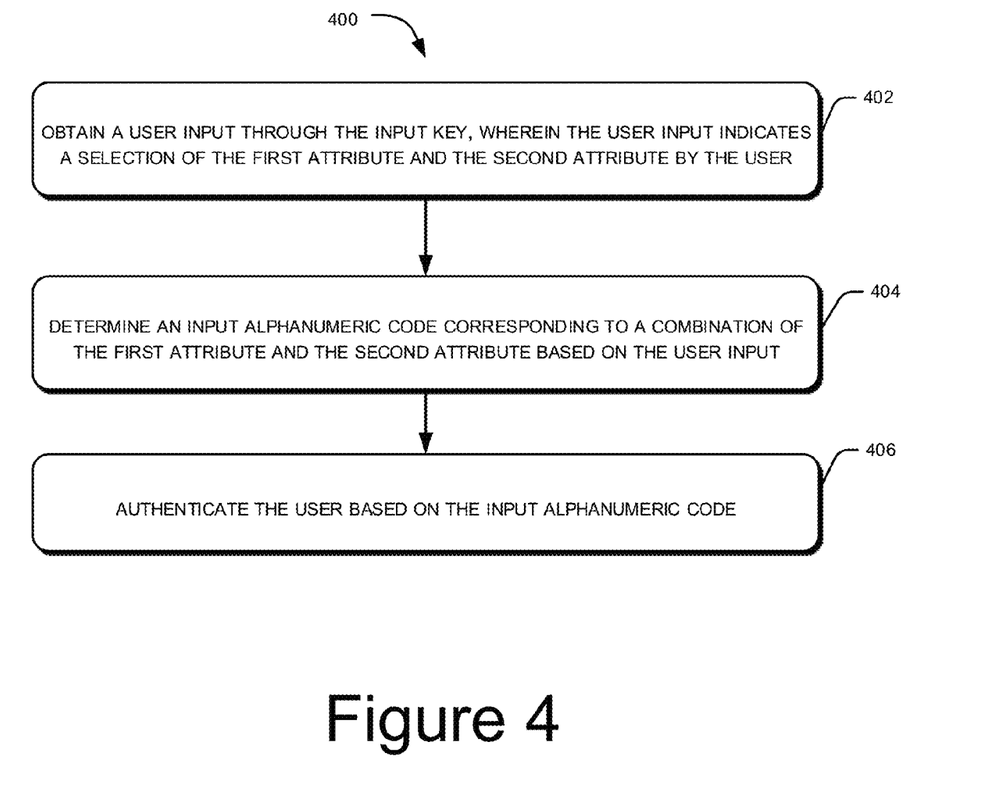
FIG. 4 illustrates an exemplary computer implemented method for authenticating a user, according to some embodiments of the present disclosure.

FIG. 4 illustrates an exemplary computer implemented method for authenticating a user, according to some embodiments of the present disclosure.

The methods 300 and 400 may be described in the general context of computer executable instructions. Generally, computer executable instructions can include routines, programs, objects, components, data structures, procedures, modules, and functions, which perform particular functions or implement particular abstract data types. The methods 300 and 400 may also be practiced in a distributed computing environment where functions are performed by remote processing devices that are linked through a communication network. In a distributed computing environment, computer executable instructions may be located in both local and remote computer storage media, including memory storage devices.

The order in which the methods 300 and 400 are described is not intended to be construed as a limitation, and any number of the described method blocks can be combined in any order to implement the methods 300 and 400 or alternative methods. Additionally, individual blocks may be deleted from the methods 300 and 400 without departing from the spirit and scope of the subject matter described herein. Furthermore, the methods 300 and 400 can be implemented in any suitable hardware, software, firmware, or combination thereof With reference to method 300 as depicted in FIG. 3, as shown in block 302, a first attribute and a second attribute are associated to at least one alphanumeric code upon receiving an authentication request for authenticating a user. Examples of the first attribute and the second attribute may include at least one of colors, shapes, special characters, and images. In an example, when a user authentication is to be carried out to complete a financial transaction or to unlock a device, the authentication request is sent to the system 100. The authentication request is then received by the transaction processor 102 present in the system 100. The transaction processor 102 instructs the keypad generation module 104 to generate the secure locking interface. Upon receiving the instructions, the keypad generation module 104 coordinates with the shape generation module 106 and the color generation module 108 to generate the shapes and colors. In case, where two different colors are to be associated with the alphanumeric codes, the color scrambler 110 ensures that both the colors have different shades and should be easily distinguishable so that the user doesn't find it difficult to recognize the colors. Further, the shapes and colors generated may be then associated with alphanumeric codes present in the keypad. In an example, the color generation module 108 and the shape generation module 106 may generate the color and shapes respectively based on card information and transaction information, such as card number, name of card holder, expiry date, transaction Id, transaction amount, and merchant name so that each time a different secure locking interface is generated for the same card.

At block 304, alphanumeric interface is rendered to the touch-screen display. The alphanumeric interface may comprise the alphanumeric codes with the first attribute and the second attribute associated. In an example, the keypad generation module 104 receives the colors and shapes generated by the color generation module 108 and shape generation module 106 respectively. Thereafter, the keypad generation module 104 may associate the colors and the shapes as a first attribute and a second attribute to each of the alphanumeric codes. The keypad generation module 104 makes these associations in such a manner that a combination of a color and a shape is never repeated. However, in case two different colors are associated with the alphanumeric codes as a first attribute and a second attribute, a combination of two different colors may be repeated but sequence of the combination may not be same.

Further, the keypad generation module 104 may instruct the PIN interface 114 to render the alphanumeric interface comprising the alphanumeric codes with the first attribute and the second attribute. The PIN interface 114 renders the alphanumeric display to a touch-screen display of a computing device which requested for the user authentication.

At block 306, a keypad interface is rendered to the touch-screen display. The keypad interface may comprise an input key for each of the first attribute and the second attribute that are associated with the alphanumeric codes. In an example, the keypad generation module 104 informs the PIN interface 114 about the attributes, i.e., the colors and the shapes that are associated with the alphanumeric codes. Then, the PIN interface 114 may render the keypad interface to the touch-screen display. In an example, if Red, Blue, and Green color are associated with the alphanumeric codes, then the keypad interface may have one input key for each of the Red, Blue, and Green color.

In this manner, the secure locking interface, comprising the alphanumeric interface and the keypad interface, is rendered to the touch-screen and user can provide the PIN securely through the keypad interface without compromising on security of the PIN in public places.

With reference to method 400 as depicted in FIG. 4, as shown in block 402, a user input is obtained through the input key present on the keypad interface. The user input indicates a selection of the first attribute and the second attribute by the user. In an example, the user may press the input keys to select the first attribute and the second attribute corresponding to the alphanumeric codes present in PIN of the user. For example, if the PIN has numeric 1 in it and it is shown in the alphanumeric interface that Red color and Circle shape is associated with the numeric 1, then the user may press the input keys for the Red color and Circle shape.

At block 404, an input alphanumeric code, corresponding to a combination of the first attribute and the second attribute, is determined based on the user input. The user may repeat the step of pressing the input keys corresponding to the attributes for each of the alphanumeric code present in the PIN. In an example, the transaction processor 102 receives the user input and sends it to the PIN assembler 112 for interpretation. The PIN assembler 112 interprets the combination of the color and shapes or combination of color and color to determine the alphanumeric code corresponding to the combination. In an example, if Red color and Circle shape are associated with the numeric 1, upon receiving the Red color and Circle shape in the user input, then the PIN assembler 112 may interpret that the user input corresponds to numeric 1. In this manner, the PIN of the user is determined.

At block 406, the user is authenticated based on the input alphanumeric code. In an example, once the alphanumeric codes present in the PIN, or in other words the PIN, is determined, the PIN assembler 112 may send the PIN to the transaction processor 102 which may further send the PIN to an authorization entity, over a secure network, to complete authentication process. If the PIN is correct, the user is authenticated and the financial transaction is completed. If the PIN is incorrect, the authentication of user fails and financial transaction is cancelled. Further, the transaction processor 102 receives the authentication message, failure or success message, from the authorization entity and informs the same to the user through the touch-screen display. In another example, if the system 100 is configured in a device for carrying authentication for unlocking the device, the transaction processor 102 may match the PIN with a PIN present in a repository of the device, to provide or restrict access to the device.

Thus, present subject matter generates a secure locking interface that allows the users to securely enter the PIN in public places, through the input keys for the attributes, without disclosing the PIN to prying eyes of shoulder surfers and onlookers. Further, the present subject matter ensures that process of inputting the PIN should not become complex by using easily recognizable shapes and colors. Furthermore, since in the present subject matter, layout of the keypad is not changed and the input is provided through the input keys corresponding to the attributes, probability of a user making an error, while inputting the PIN, is minimized.

Computer System

Figure 5:
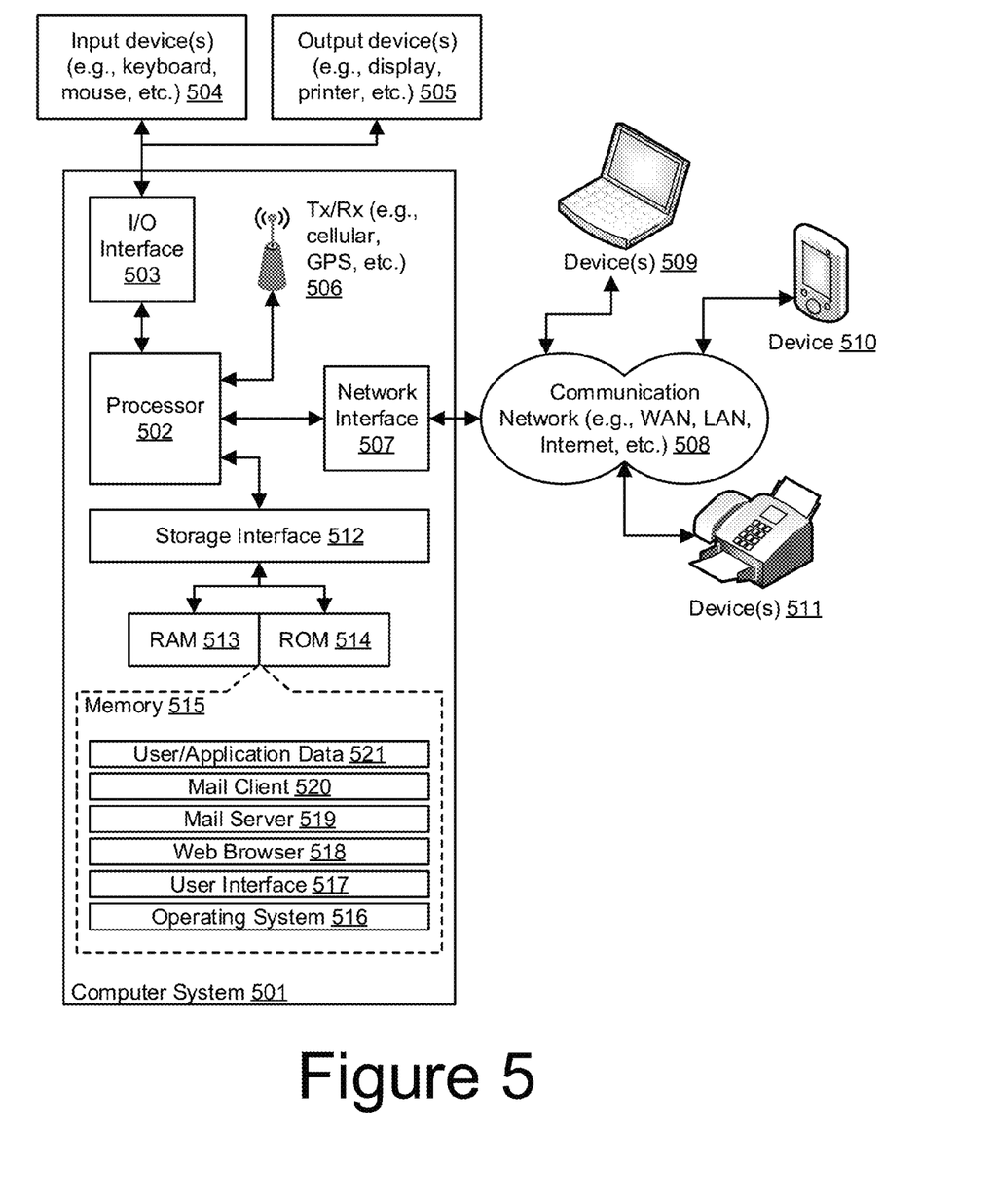
FIG. 5 illustrates a block diagram of an exemplary computer system for implementing embodiments consistent with the present disclosure.

FIG. 5 is a block diagram of an exemplary computer system for implementing embodiments consistent with the present disclosure. Variations of computer system 501 may be used for implementing any of the devices presented in this disclosure. Computer system 501 may comprise a central processing unit ("CPU" or "processor") 502. Processor 502 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touchscreen, touchpad, trackball, sensor (e.g., accelerometer, light sensor, GPS, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 318-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 510, 511, and 512. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 501 may implement a web browser 518 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol); secure sockets layer (SSL), Transport Layer Security (TLS), etc. Web browsers may utilize facilities such as AJAX, DHTML, Adobe Flash, JavaScript, Java; application programming interfaces (APIs), etc. In some embodiments, the computer system 501 may implement a mail server 519 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 501 may implement a mail client 520 stored program component. The mail client may be a mail viewing application, such as Apple Mail, Microsoft Entourage, Microsoft Outlook, Mozilla Thunderbird, etc.

In some embodiments, computer system 501 may store user/application data 521, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described methods and systems for evaluating source code scanners. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for generating a secure locking interface on a touch-screen display, the method comprising:
  associating, by a touch screen management computing device, a first attribute and a second attribute to at least one alphanumeric code upon receiving an authentication request for authenticating a user, wherein the first attribute is a color and the second attribute is a shape, the associating comprising randomly selecting the color from a plurality of colors and the shape from a plurality of shapes for each authorization request;
  rendering, by the touch screen management computing device, an alphanumeric display, to the touch-screen display, wherein the alphanumeric display is a non-input display that displays the at least one alphanumeric code with the first attribute and the second attribute associated; and
  rendering, by the touch screen management computing device, a keypad interface, to the touch-screen display, wherein the keypad interface has an input key for each of the first attribute and the second attribute, and wherein the keypad interface is rendered separate from the alphanumeric display.

2. The method of claim 1 further comprising:
obtaining, by the touch screen management computing device, a user input through the input key, wherein the user input indicates a selection of the first attribute and the second attribute by the user;
determining, by the touch screen management computing device, an input alphanumeric code corresponding to a combination of the first attribute and the second attribute based on the user input; and
authenticating, by the touch screen management computing device, the user based on the input alphanumeric code.

3. The method of claim 1, wherein each of the at least one alphanumeric code has a unique combination of the first attributes and the second attribute.

4. The method of claim 1, wherein one or more alphanumeric codes of the at least one alphanumeric code have a same combination of the first attribute and the second attribute, wherein a sequence of the first attribute and the second attribute is different for each of the or more alphanumeric codes.

5. A touch screen management computing device, comprising:
a processor coupled to a memory and configured to execute programmed instructions stored in the memory, comprising:
associating a first attribute and a second attribute to at least one alphanumeric code upon receiving an authentication request for authenticating a user, wherein the first attribute is a color and the second attribute is a shape, the associating comprising randomly selecting the color from a plurality of colors and the shape from a plurality of shapes for each authorization request;
rendering an alphanumeric display, to a touch-screen display, wherein the alphanumeric display is a non-input display that displays the at least one alphanumeric code with the first attribute and the second attribute associated; and
rendering a keypad interface, to the touch-screen display, wherein the keypad interface has an input key for each of the first attribute and the second attribute, and wherein the keypad interface is rendered separate from the alphanumeric display.

6. The device of claim 5, wherein the processor is further configured to execute programmed instructions stored in the memory further comprising:
obtaining a user input through the input key, wherein the user input indicates a selection of the first attribute and the second attribute by the user;
determining an input alphanumeric code corresponding to a combination of the first attribute and the second attribute based on the user input; and
authenticating the user based on the input alphanumeric code.

7. The device of claim 5, wherein each of the at least one alphanumeric code has a unique combination of the first attributes and the second attribute.

8. The device of claim 5, wherein one or more alphanumeric codes of the at least one alphanumeric code have a same combination of the first attribute and the second attribute, wherein a sequence of the first attribute and the second attribute is different for each of the or more alphanumeric codes.

9. A non-transitory computer readable medium having stored thereon instructions for generating a secure locking interface on a touch-screen display comprising machine executable code which when executed by a processor, causes the processor to perform steps comprising:
associating a first attribute and a second attribute to at least one alphanumeric code upon receiving an authentication request for authenticating a user, wherein the first attribute is a color and the second attribute is a shape, the associating comprising randomly selecting the color from a plurality of colors and the shape from a plurality of shapes for each authorization request;
rendering an alphanumeric display, to the touch-screen display, wherein the alphanumeric display is a non-input display that displays the at least one alphanumeric code with the first attribute and the second attribute associated; and
rendering a keypad interface, to the touch-screen display, wherein the keypad interface has an input key for each of the first attribute and the second attribute, and wherein the keypad interface is rendered separate from the alphanumeric display.

10. The medium of claim 9, wherein the medium further comprises machine executable code which, when executed by the processor, causes the processor to perform steps further comprising:
obtaining a user input through the input key, wherein the user input indicates a selection of the first attribute and the second attribute by the user;
determining an input alphanumeric code corresponding to a combination of the first attribute and the second attribute based on the user input; and
authenticating the user based on the input alphanumeric code.

11. The medium of claim 9, wherein each of the at least one alphanumeric code has a unique combination of the first attributes and the second attribute.

12. The medium of claim 9, wherein one or more alphanumeric codes of the at least one alphanumeric code have a same combination of the first attribute and the second attribute, wherein a sequence of the first attribute and the second attribute is different for each of the or more alphanumeric codes.

* * * * *